US011990705B2

(12) United States Patent
Zhong et al.

(10) Patent No.: US 11,990,705 B2
(45) Date of Patent: May 21, 2024

(54) WET-MATE CONNECTOR ASSEMBLY WITH A DIELECTRIC GREASE RETAINER AND A STIFFENING MATERIAL IN A WELLBORE

(71) Applicant: Halliburton Energy Services, Inc., Houston, TX (US)

(72) Inventors: Xiaoguang Allan Zhong, Singapore (SG); Marco Antonio dos Santos Fernandes, Macae (BR); Shengjun Yin, Frisco, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 133 days.

(21) Appl. No.: 17/564,412

(22) Filed: Dec. 29, 2021

(65) Prior Publication Data

US 2023/0208075 A1 Jun. 29, 2023

(51) Int. Cl.
*H01R 13/523* (2006.01)
*E21B 17/02* (2006.01)
(Continued)

(52) U.S. Cl.
CPC ..... *H01R 13/5219* (2013.01); *E21B 17/0285* (2020.05); *H01R 43/005* (2013.01); *H01R 13/523* (2013.01)

(58) Field of Classification Search
None
See application file for complete search history.

(56) References Cited

U.S. PATENT DOCUMENTS 4,557,538 A 12/1985 Chevalier
5,131,464 A 7/1992 Lenhart et al.
(Continued)

FOREIGN PATENT DOCUMENTS

WO 2021092458 A1 5/2021

OTHER PUBLICATIONS

Halliburton Energy Services, Inc , "Expandable Liner Hanger System Provides Robust Alternative in Challenging Well Environment", XtremeGrip liner hanger case study, 2020, 2 pages.
(Continued)

*Primary Examiner* — Tho D Ta
(74) *Attorney, Agent, or Firm* — Kilpatrick Townsend & Stockton LLP

(57) ABSTRACT

Systems and methods are provided for a wet-mate connector assembly that can include a stiffening material and a dielectric grease retainer for preventing the extrusion of dielectric grease during a wet connect. The wet-mate connector assembly can include a male portion and a female portion that can receive the male portion to form an electrical connection with the male portion. The wet-mate connector assembly can also include a dielectric grease retainer that can be positioned near the male portion and the female portion for retaining dielectric grease extruded from a contact chamber when the female portion receives the male portion. The dielectric grease retainer can seal and insulate the contact chamber. The contact chamber can be defined by an outer diameter of the male portion and an inner diameter of the female portion. The male portion and the female portion can include a stiffening material and an insulating material.

20 Claims, 9 Drawing Sheets

(51) Int. Cl.
*H01R 13/52* (2006.01)
*H01R 43/00* (2006.01)

(56) References Cited

U.S. PATENT DOCUMENTS

| | | | | |
|---|---|---|---|---|
| 6,511,335 | B1 * | 1/2003 | Rayssiguier | H01R 13/523 439/191 |
| 7,594,763 | B2 * | 9/2009 | Richards | E21B 17/028 166/385 |
| 7,814,969 | B2 | 10/2010 | Shaw | |
| 9,103,207 | B2 * | 8/2015 | Richards | E21B 43/08 |
| 9,197,006 | B2 * | 11/2015 | Hack | H01R 13/523 |
| 9,580,981 | B2 | 2/2017 | Zhong et al. | |
| 10,044,134 | B2 * | 8/2018 | Nicholson | H01R 13/5219 |
| 11,105,160 | B2 * | 8/2021 | Leismer | H01R 13/5219 |
| 11,180,968 | B2 * | 11/2021 | Mitchell | E21B 33/043 |
| 2003/0211768 | A1 | 11/2003 | Cameron et al. | |
| 2005/0074210 | A1 * | 4/2005 | Grigsby | E21B 17/028 385/53 |
| 2013/0048307 | A1 * | 2/2013 | Patel | E21B 17/023 166/85.1 |
| 2021/0296813 | A1 * | 9/2021 | Burrow | H01R 43/18 |
| 2023/0131231 | A1 * | 4/2023 | Minassa | H01R 13/03 439/190 |

OTHER PUBLICATIONS

Izetti et al., "Downhole Electrical Disconnect Tool Enables the Parting and Subsequent ReConnection of the Upper Completion Containing an ESP from the Lower Intelligent Completion", Paper presented at the SPE Saudi Arabia Section Technical Symposium and Exhibition, Al-Khobar, Saudi Arabia, Apr. 21, 2014.

International Search Report and Written Opinion, PCT/US2021/065456, Sep. 23, 2022, 10 pages.

PCT/US2021/065456, "International Search Report and Written Opinion", Sep. 23, 2022, 10 pages.

* cited by examiner

WET-MATE CONNECTOR ASSEMBLY WITH A DIELECTRIC GREASE RETAINER AND A STIFFENING MATERIAL IN A WELLBORE

TECHNICAL FIELD

The present disclosure relates generally to wet-mate connector assemblies for downhole power transmission and, more particularly (although not necessarily exclusively), to a wet-mate connector assembly with a dielectric grease retainer that can be deployed in a wellbore.

BACKGROUND

A wet-mate connector may be able to make an electric connection in fluid in a wellbore or in a subsea environment with respect to a wellbore. Wet-mate connectors can be used to provide electricity and data communications to equipment installed in wet environments in or around the wellbore. Wet-mate connectors can be disconnected and reconnected in a wet environment to allow for redressing or servicing of the connectors or tools coupled to the connectors.

DETAILED DESCRIPTION

Figure 1:
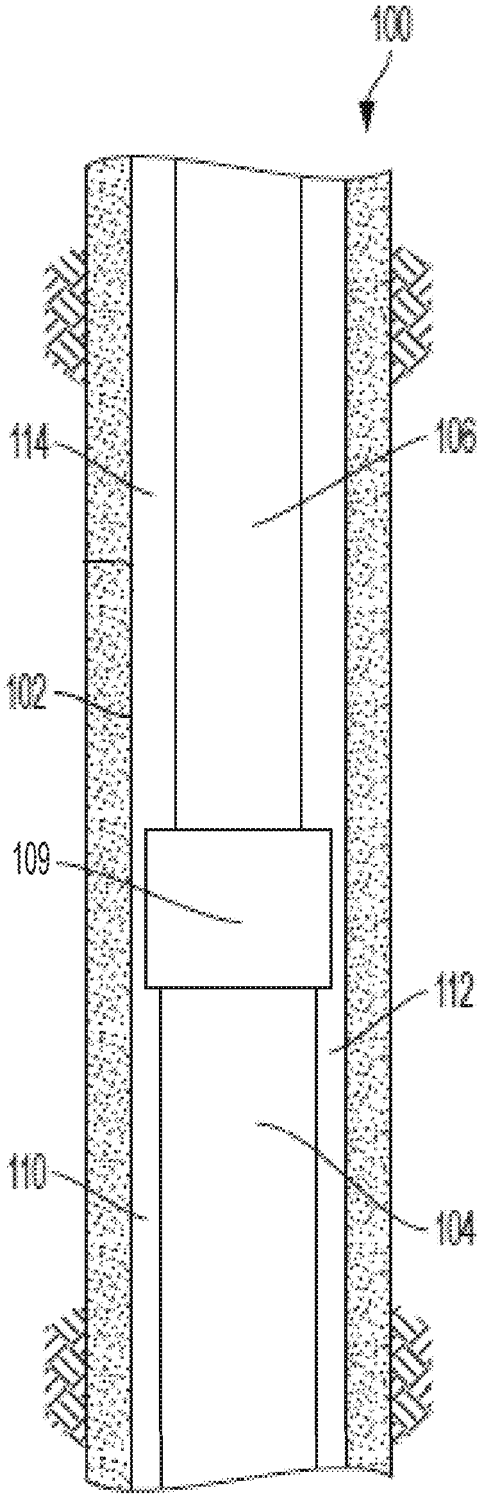
FIG. 1 is a contextual diagram of a well system with a wet-mate connector assembly according to one example of the present disclosure.

Certain aspects and examples of the present disclosure relate to a wet-mate connector assembly with a dielectric grease retainer and a stiffening material for decreasing fluid intake and retaining dielectric grease during electric connections and disconnections. A wet-mate connector assembly can include two portions, such as a male portion and a female portion, which can be mechanically mated together during a wet stab-in to make an electrical connection underwater. The wet-mate connector assembly can include a dielectric grease for repelling fluid from the chamber formed between the male portion and the female portion, thus preventing the chamber from functioning as an electrical conduit. The dielectric grease may also protect exposed components of the wet-mate connector assembly from corrosion. A dielectric grease retainer may retain dielectric grease extruded during a wet stab-in. In some examples, the dielectric grease and its retainer may improve the sealing performance of the wet-mate connector assembly, which may improve the electric insulation during the wet stab-in and thereafter. A stiffening material may be a hard material that can be placed within portions of the wet-mate connector assembly to stiffen an insulating material. The insulating material may provide the wet-mate connector assembly with an electrical resistance and protect electrical wiring from exposure to fluids. The dielectric grease may repel fluids and protect exposed components of the wet-mate connector assembly from corrosion.

In some examples, the dielectric grease retainer can be positioned within the wet-mate connector assembly to prevent dielectric grease extrusion. In some examples, dielectric grease can be extruded from a cavity formed when the two portions of the wet-mate connector assembly are connected or disconnected during a wet stab-in. When dielectric grease is extruded, the remaining dielectric grease can become porous and allow fluids to enter the wet-mate connector assembly. Preventing dielectric grease extrusion can allow the wet-mate connector to maintain electrical resistance during multiple wet stab-ins downhole in the wellbore.

In some examples, the stiffening material may stiffen an insulating material of the wet-mate connector assembly. The insulating material of a wet-mate connector assembly without a stiffener or with an insufficiently stiff stiffening material may experience deflection or deformation. The deflection or deformation may be caused by the varying pressure and temperature cycles experienced downhole in the wellbore. For example, high pressures and temperatures in the wellbore can cause insulating materials that are rubber or polymer to experience thermal aging or permanent set. The deflection or deformation of the insulating material may cause a decrease in contact pressure and may allow fluids to enter the contact chamber, weakening the electrical resistance of the wet-mate connector assembly. The stiffening material may increase contact pressure in the wet-mate connector assembly, which may increase the electrical resistance of the wet-mate connector assembly and reduce an amount of fluid ingress in the contact chamber. In some examples, the inclusion of the stiffening material may stiffen the insulating material without loss of insulation capabilities.

In one particular example, the wet-mate connector assembly can include a male portion and a female portion that can be mechanically mated together to form an electrical connection between a male electrical contact and a female electrical contact. The male portion may include a male insulator band that may provide electrical resistance to uphole wiring. The female portion may include a female insulator band for providing electrical resistance to downhole wiring. The male insulator band and the female insulator band may be made of an insulating material. The wet-mate connector assembly can include a contact chamber formed by the male portion and the female portion. The contact chamber can encapsulate the male electrical contact and the female electrical contact. The contact chamber may be insulated with contact chamber seals. The contact chamber may contain a dielectric grease for repelling fluids, preventing the chamber from functioning as an electric conduit. The dielectric grease can protect exposed components of the wet-mate connector assembly from corrosion. In some examples, the dielectric grease may be a grease, such as silicone grease or another dielectric grease. The wet-mate connector assembly may also include a compensation chamber for compensating for a pressure difference between the contact chamber and an annulus between production tubing and casing. The wet-mate connector assembly can include a dielectric grease retainer that can be positioned between the contact chamber seals. The dielectric grease retainer may prevent dielectric grease from being extruded from the contact chamber during a wet stab-in and may prevent fluid ingress into the contact chamber. In some examples, the dielectric grease retainer may be a cup seal, a ribbed seal, or a shallow ribbed seal.

The wet-mate connector assembly may also include a stiffening material. The stiffening material may prevent a deformation of the wet-mate connector assembly and may increase a contact pressure in the contact chamber. In some examples, the stiffening material may be a steel material or a ceramic material. The insulator material may be a ceramic or polyetheretherketone (PEEK) material. In some examples, the stiffening material may be positioned on an outer diameter of the insulator material and an inner diameter of the insulator material. In some examples, the stiffening material may be positioned in grooves present on the outer diameter and inner diameter of the insulator material. In some examples, the stiffening material may be encapsulated by the insulating material.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a contextual diagram of a well system 100 with a wet-mate connector assembly 109 according to one example of the present disclosure. The well system 100 includes a wellbore 102. In some examples, the wellbore 102 can be cased and cemented, as shown in FIG. 1. In other examples, the wellbore 102 can be uncased or the casing may not be cemented.

The wellbore 102 can include a tubular string 104, for example, a downhole completion string. The tubular string 104 can be positioned in a downhole portion 112 of the wellbore 102 relative to a wet-mate connector assembly 109. An annulus 110 can be formed between the tubular string 104 and the wellbore 102. The wellbore 102 can further include a tubular string 106, for example, an uphole completion string. The tubular string 106 can be positioned in an uphole portion 114 of the wellbore 102 with respect to the wet-mate connector assembly 109. The wet-mate connector assembly 109 may provide an electrical connection between an electric line associated with the tubular string 106 and a hydraulic line associated with the tubular string 104, respectively. In doing so, the wet-mate connector assembly 109 may form an electrical connection between equipment that can be positioned on the surface and a tool that can be positioned downhole in the wellbore 102, such as a sensor component.

Figure 2:
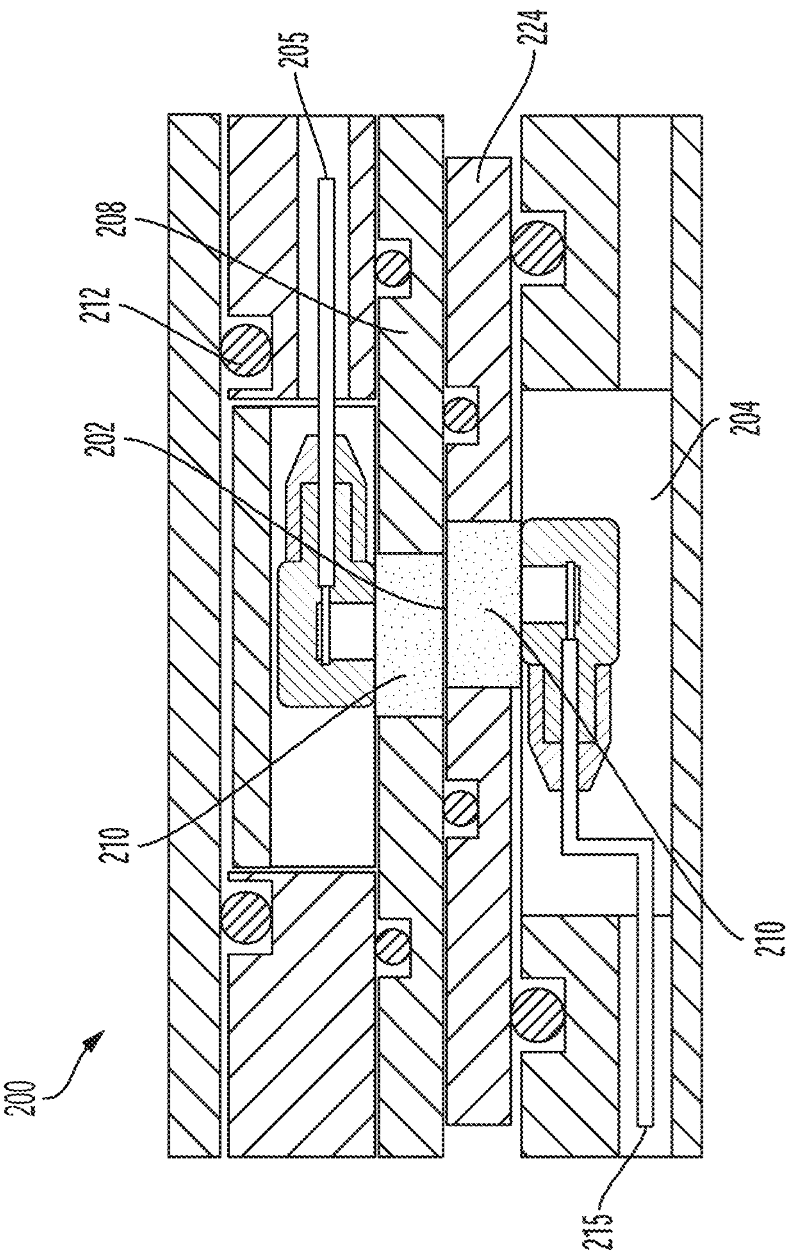
FIG. 2 is a cross-sectional diagram of a wet-mate connector assembly according to one example of the present disclosure.

FIG. 2 is a cross-sectional diagram of a wet-mate connector assembly 200 according to one example of the present disclosure. In some examples, the wet-mate connector assembly 200 can include a male insulator band 224 and a female insulator band 208 that can be mechanically mated together for forming an electrical connection between electrical contact rings 210 that can be coupled to the male insulator band 224 and the female insulator band 208. The wet-mate connector assembly 200 may be deployable in the wellbore 102. The male insulator band 224 may provide electrical resistance to uphole wiring 215 and downhole wiring 205 when coupled to the female insulator band 208. The male insulator band 224 and the female insulator band 208 may be made of an insulating material.

The wet-mate connector assembly 200 can include a contact chamber 202 formed by the male insulator band 224 and the female insulator band 208. The contact chamber 202 can encapsulate the electrical contact rings 210. The contact chamber 202 may be insulated with contact chamber seals. The contact chamber 202 may contain a dielectric grease for repelling fluids, that can prevent the chamber from functioning as an electrical conduit. The dielectric grease can protect exposed components of the wet-mate connector assembly 200 from corrosion. In some examples, the dielectric grease may be a grease such as silicone grease. The wet-mate connector assembly 200 may also include a compensation chamber 204 for compensating for a pressure imbalance between the contact chamber 202 and a tool annulus. The wet-mate connector assembly 200 may include one or more body O-rings 212 which may seal off a junction between the male insulator band 224 and compensation chamber 204 or the female insulator band 208 and compensation chamber 204 to prevent fluids from entering the compensation chamber 204. The wet-mate connector assembly 200 can be positioned downhole in the wellbore 102 and can be used to form an electrical connection between surface equipment and a tool that may be positioned downhole in the wellbore 102, such as a sensor component.

In some examples, the wet-mate connector assembly 200 may additionally include a dielectric grease retainer for retaining dielectric grease extruded from the contact chamber 202 during a stab-in. For example, the dielectric grease retainer may be a ribbed seal, a cup seal, or a ribbed seal with angular ridges. In some examples, the contact chamber seals and the dielectric grease retainer may be made of an insulating material such as a rubber material. The rubber material may include compounds that can increase the bulk modulus, decrease the shear modulus, increase the permanent set resistance, and increase the thermal stability of the rubber material.

In some examples, the male insulator band 224 and the female insulator band 208 may be made from insulating materials such as PEEK, ceramic, or polyamide-imide (PAI). But these insulating materials may experience issues during stab-ins. For example, insulator bands made from PEEK or fiber-glass filled PEEK may not be stiff enough to prevent deflection. Insulator bands made from ceramic can be stiffer but may be prone to cracking. Insulator bands made from PAI may also be stiffer but may have fluid incompatibility issues. In some examples, the male insulator band 224 and the female insulator band 208 may additionally include stiffening materials for increasing stiffness without significantly decreasing insulation. For example, the male insulator band 224 and female insulator band 208 may include insulating material such as ceramic or PEEK, along with stiffening material such as rebar embedded within the insulating material. In some examples, the dielectric grease used in the wet-mate connector assembly 200 may be chosen to increase viscosity based on the materials used in the male insulator band 224 and the female insulator band 208.

Figure 3:
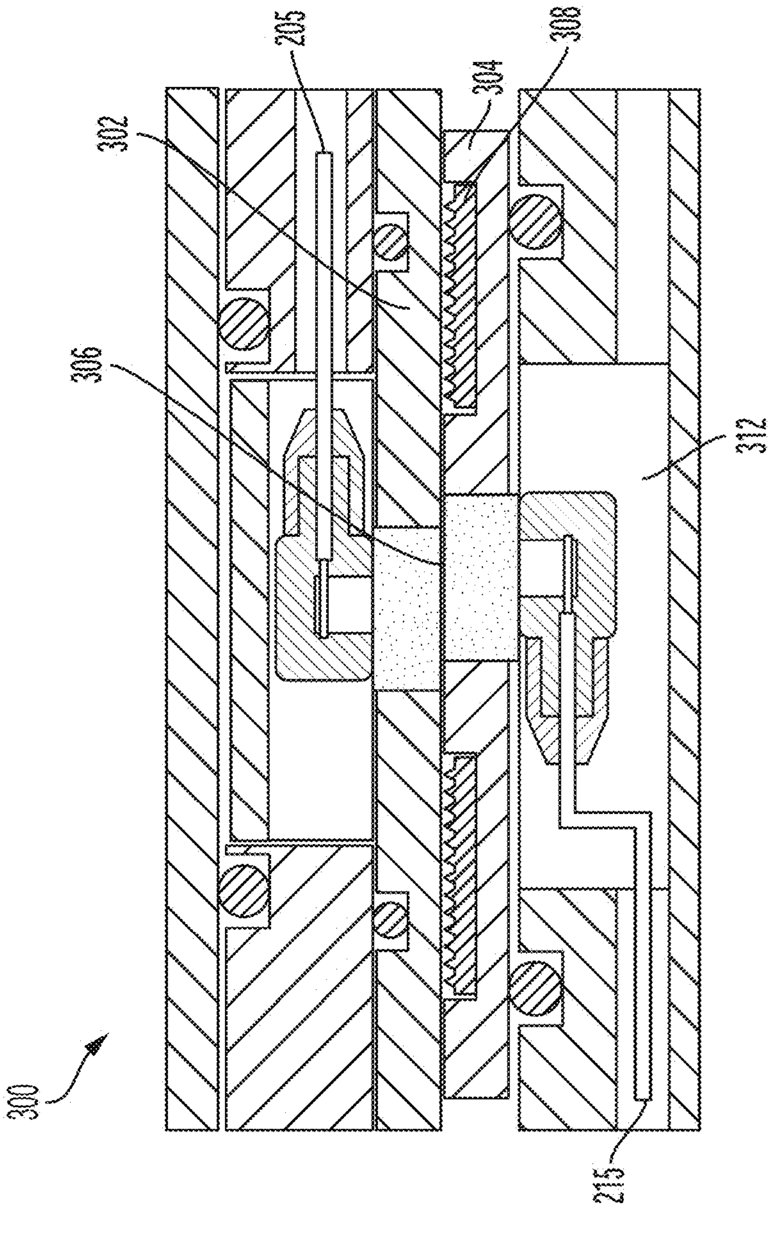
FIG. 3 is a cross-sectional diagram of a wet-mate connector assembly with a ribbed seal with multiple sealing segments according to one example of the present disclosure.

FIG. 3 is a cross-sectional diagram of a wet-mate connector assembly 300 with a ribbed seal 308 according to one example of the present disclosure. The seal 308 may be a dielectric grease retainer for retaining grease extruded during a wet connect. The wet-mate connector assembly 300 may form an electrical connection between an uphole wiring 215 and a downhole wiring 205. The male insulator band 304 of a male portion can be coupled to a female insulator band 302 of a female portion. The male insulator band 304 and the female insulator band 302 may be made of an insulating material. The insulating material may include a ceramic material, a PEEK material, or another insulating material. The insulating material may insulate components encapsulated by the insulating material from electrical current. The wet-mate connector assembly 300 can include a compensation chamber 312 to compensate for a change in a volume of dielectric grease. In some examples, the dielectric grease may be a grease such as silicone grease. The dielectric grease may be included in the contact chamber 306 and may repel fluids, and can thereby prevent the contact chamber 306 from functioning as an electrical conduit. The dielectric grease can also protect exposed components of the wet-mate connector assembly 300 from corrosion. The ribbed seal 308 may prevent dielectric grease from being extruded when the male portion and the female portion are connected or disconnected. The ribbed seal 308 may have ridges or sealing segments that can trap dielectric grease and prevent the dielectric grease from leaving the contact chamber 306. The ribbed seal 308 may be one integrated seal with multiple sealing segments, or multiple discrete seals. The ribbed seal 308 may seal the contact chamber 306 and may insulate the electrical connection formed by contact rings on the female insulator band 302 and the male insulator band 304. In some examples, the material of the ribbed seal 308 may have a high bulk modulus, a low shear modulus, a high permanent set resistance, and high thermal stability.

Figure 4:
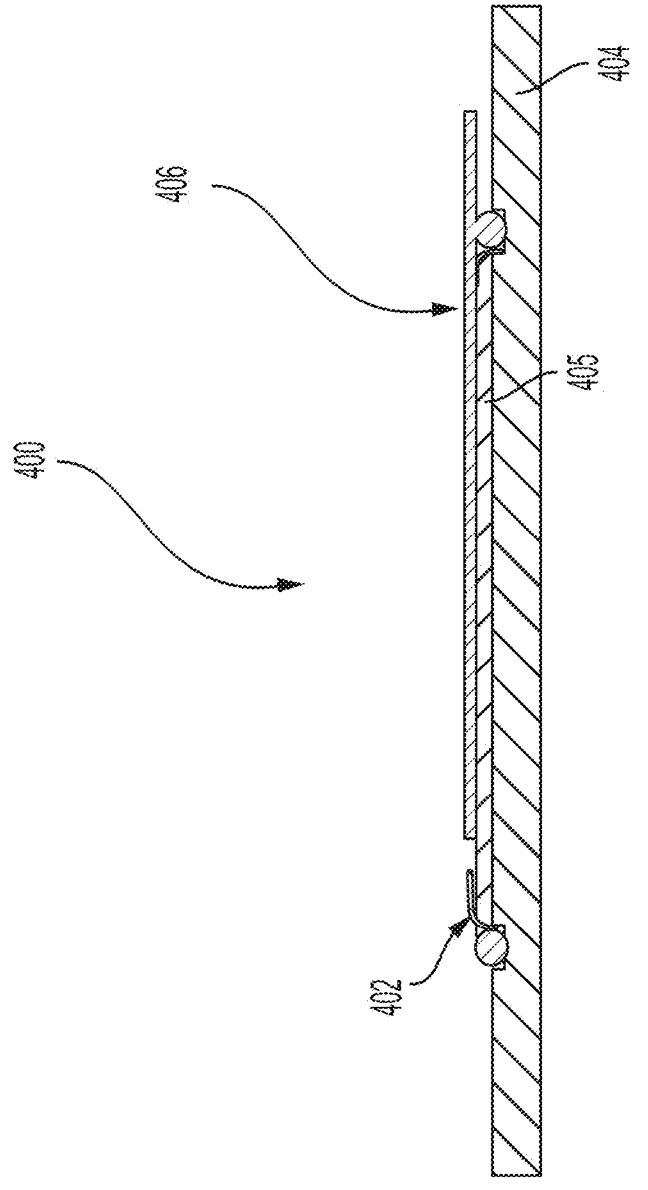
FIG. 4 is a cross-sectional diagram of a portion of a wet-mate connector assembly with a cup seal according to one example of the present disclosure.

FIG. 4 is a cross-sectional diagram of a portion of a wet-mate connector assembly 400 with a cup seal 402 according to one example of the present disclosure. The cup seal 402 may be a dielectric grease retainer for retaining grease extruded during a wet connect. The wet-mate connector assembly 400 may provide an electrical connection between an uphole line and a downhole line. A cup seal 402 may be coupled to a body O-ring 212. The body O-ring 212 can seal a space between a male portion 406 and a female portion 404 of the wet-mate connector assembly 400. The male portion 406 and the female portion 404 may be made of an insulating material. The insulating material may include a ceramic material, a PEEK material, or another insulating material. The insulating material may insulate components encapsulated by the insulating material from electrical current. The dielectric grease 405 may repel fluids, preventing the contact chamber from functioning as an electrical conduit. The dielectric grease can also protect exposed components of the wet-mate connector assembly 400 from corrosion. During a connection, an inner diameter of the female portion 404 and an outer diameter of the male portion 406 may be coupled to form a contact chamber. The cup seal 402 may prevent the dielectric grease 405 from being extruded when the male portion 406 and the female portion 404 are connected or disconnected by sealing off a fluid flow path that may connect the contact chamber to an exterior of the wet-mate connector assembly 400. This can increase a lifespan of the wet-mate connector assembly 400 and allow for multiple disconnections and reconnections, such as for redressing or servicing.

Figure 5:
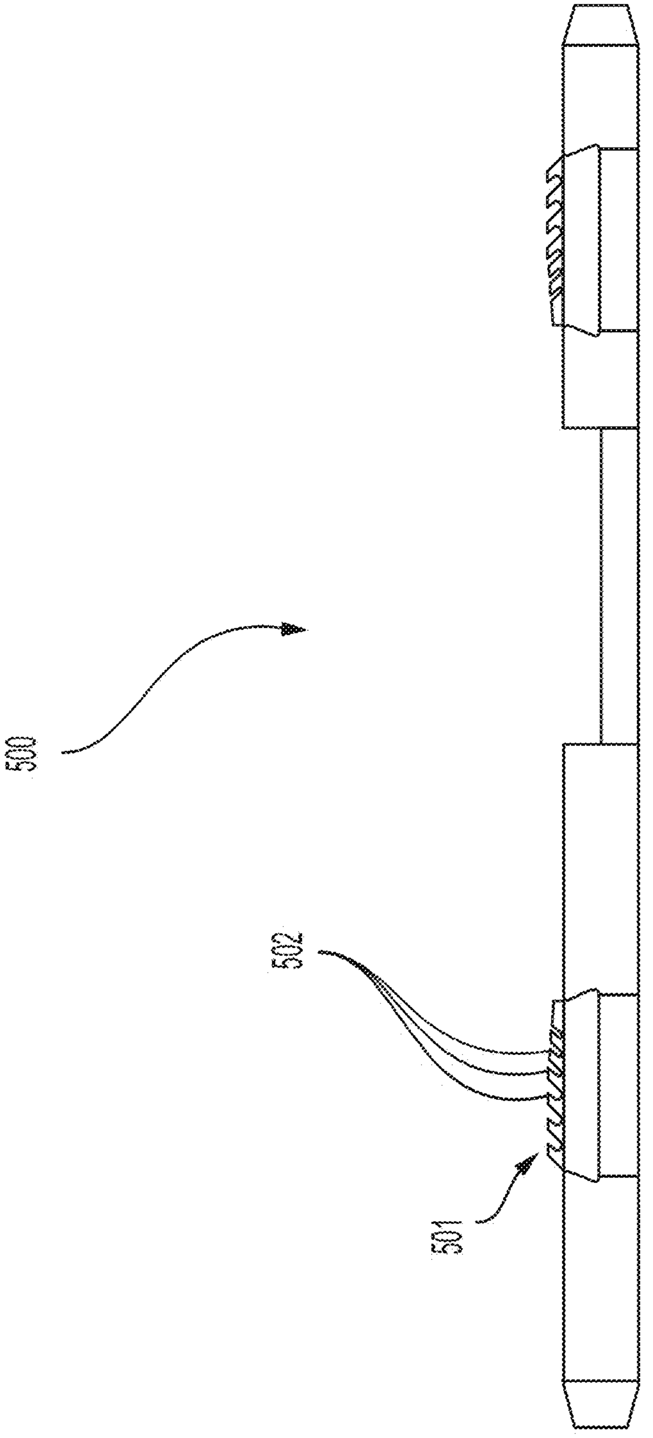
FIG. 5 is a cross-sectional diagram of a ribbed seal with angular ridges according to one example of the present disclosure.

FIG. 5 is a cross-sectional diagram of a ribbed seal 501 with angular ridges 502 according to one example of the present disclosure. The angular ridges 502 may be sealing segments. The ribbed seal 501 may be a dielectric grease retainer for retaining grease extruded during a wet connect. During an electrical connection or disconnection of a wet-mate connector assembly 500, dielectric grease extruded from within the wet-mate connector assembly 500 may be retained by the angular ridges 502 of the ribbed seal 501. In some examples, the dielectric grease may be a grease, such as silicone grease or another dielectric grease. The angular ridges 502 may retain the dielectric grease during an electric connection or disconnection by sealing off a fluid flow path connecting an interior and an exterior of the wet-mate connector assembly 500. The retained dielectric grease may repel fluids, preventing the contact chamber from functioning as an electric conduit, and protect exposed components of the wet-mate connector assembly 500 from corrosion. Preventing fluids from entering the contact chamber may increase a lifespan of the wet-mate connector assembly 500 and may allow for multiple disconnections and reconnections. The wet-mate connector assembly 500 may be disconnected and reconnected for servicing or redressing.

Figure 6:
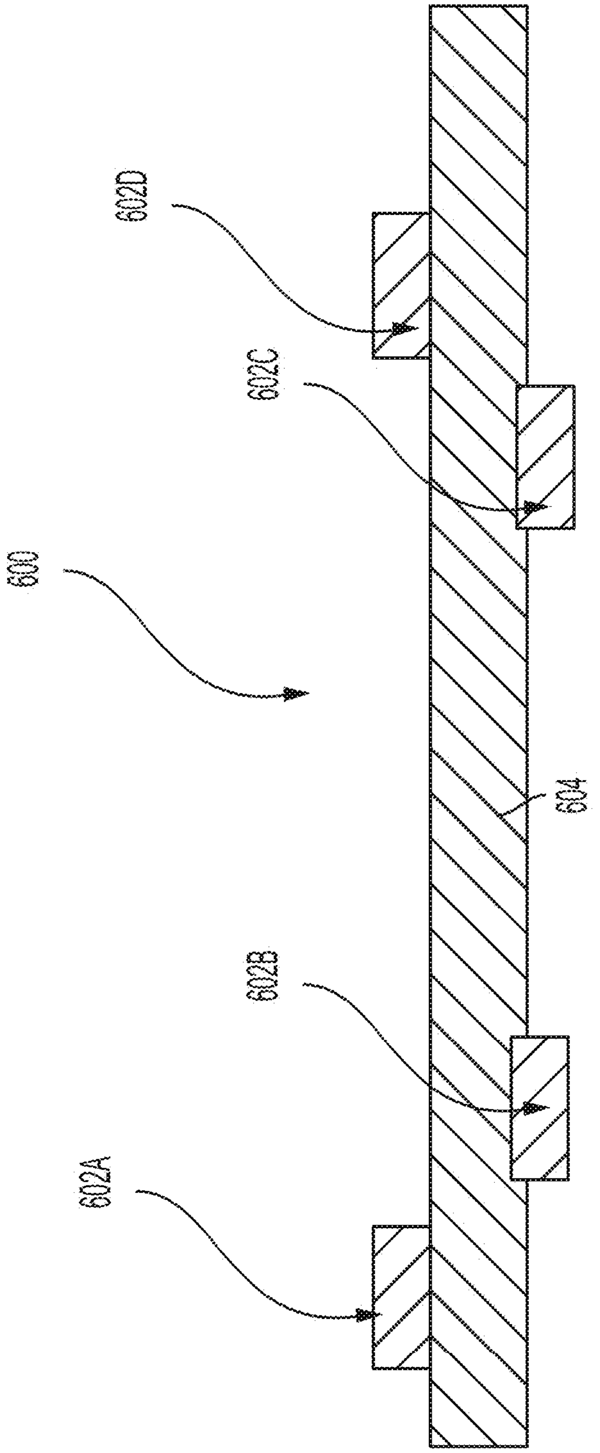
FIG. 6 is a cross-sectional diagram of a portion of a wet-mate connector assembly that includes a stiffening material within an insulating material according to one example of the present disclosure.

FIG. 6 is a cross-sectional diagram of a portion of a wet-mate connector assembly 600 that includes a stiffening material 602A-D within an insulating material 604 according to one example of the present disclosure. The stiffening material 602A-D can be embedded within an insulating material 604 of a male portion or a female portion of the wet-mate connector assembly 600. The stiffening material 602A-D may be a rebar with a rectangular cross-section. Stiffening material 602A and 602D may be placed on an outer diameter of the insulating material 604. Stiffening material 602B-C may be placed within grooves on an inner diameter of the insulating material 604. Although four stiffening materials 602 are depicted in FIG. 6, in some examples more or fewer stiffening materials 602 may be included. In some examples, the stiffness of the portion of the wet-mate connector assembly 600 may be adjusted by adjusting the amount and location of the stiffening material 602A-D. The stiffening material 602A-D can increase contact pressure of seals in a contact chamber of the wet-mate connector assembly 600 by applying pressure radially inward with respect to a center of a circular cross-section of the wet-mate connector assembly 600. The increased contact pressure may prevent fluids from entering the contact chamber. Preventing fluids from entering the contact chamber may increase a lifespan of the wet-mate connector assembly 600 and may allow the wet-mate connector assembly to function after multiple disconnections and reconnections. The wet-mate connector assembly 600 may be disconnected and reconnected for servicing or redressing.

Figure 7:
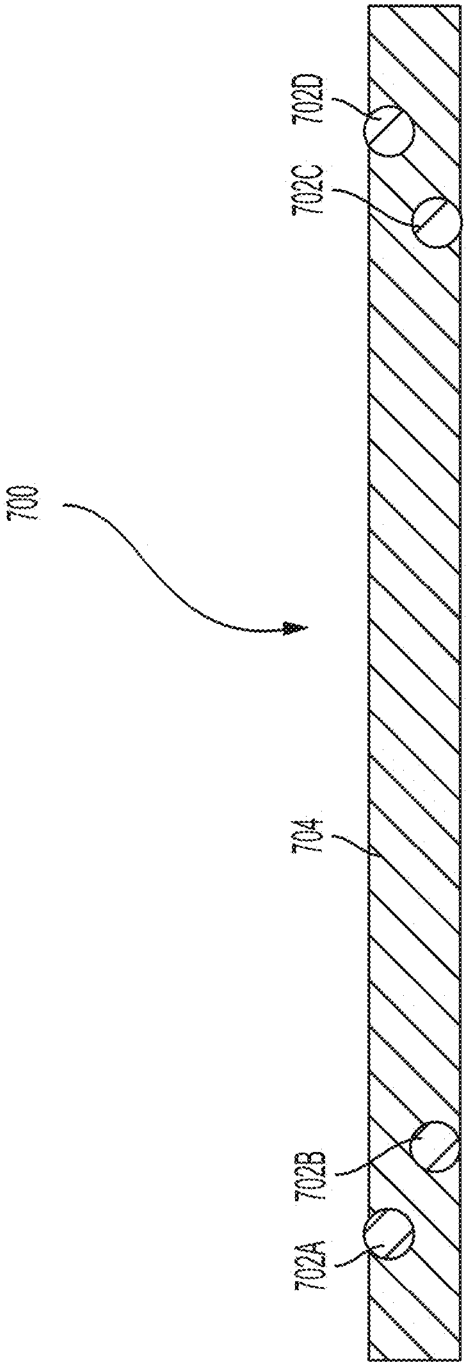
FIG. 7 is a cross-sectional diagram of a portion of a wet-mate connector assembly that includes a stiffening material within an insulating material according to one example of the present disclosure.

FIG. 7 is a cross-sectional diagram of a portion of a wet-mate connector assembly 700 that includes a stiffening material 702A-D within an insulating material 704 according to one example of the present disclosure. The stiffening material 702A-D can be embedded within an insulating material 704 of a male portion or a female portion of the wet-mate connector assembly 700. The stiffening material 702A-D can be rods that may have a circular cross-section. Stiffening material 702B-C can be positioned within an inner diameter of the insulating material 704. Stiffening material 702A and 702D can be positioned within grooves on an outer diameter of the insulating material 704. Although four stiffening materials 702 are depicted in FIG.

7, in some examples more or fewer stiffening materials 702 may be include. In some examples, the stiffness of the portion of the wet-mate connector assembly 700 may be adjusted by adjusting the amount and location of the stiffening material 702A-D. The stiffening material 702A-D can increase a contact pressure of seals in a contact chamber of the wet-mate connector assembly 700 by applying a pressure radially inward with respect to a center of a circular cross-section of the wet-mate connector assembly 700. The increased contact pressure may prevent fluids from entering the contact chamber. Preventing fluids from entering the contact chamber may increase a lifespan of the wet-mate connector assembly 700 and may allow the wet-mate connector assembly to function after multiple disconnections and reconnections. The wet-mate connector assembly 700 may be disconnected and reconnected for servicing or redressing.

Figure 8:
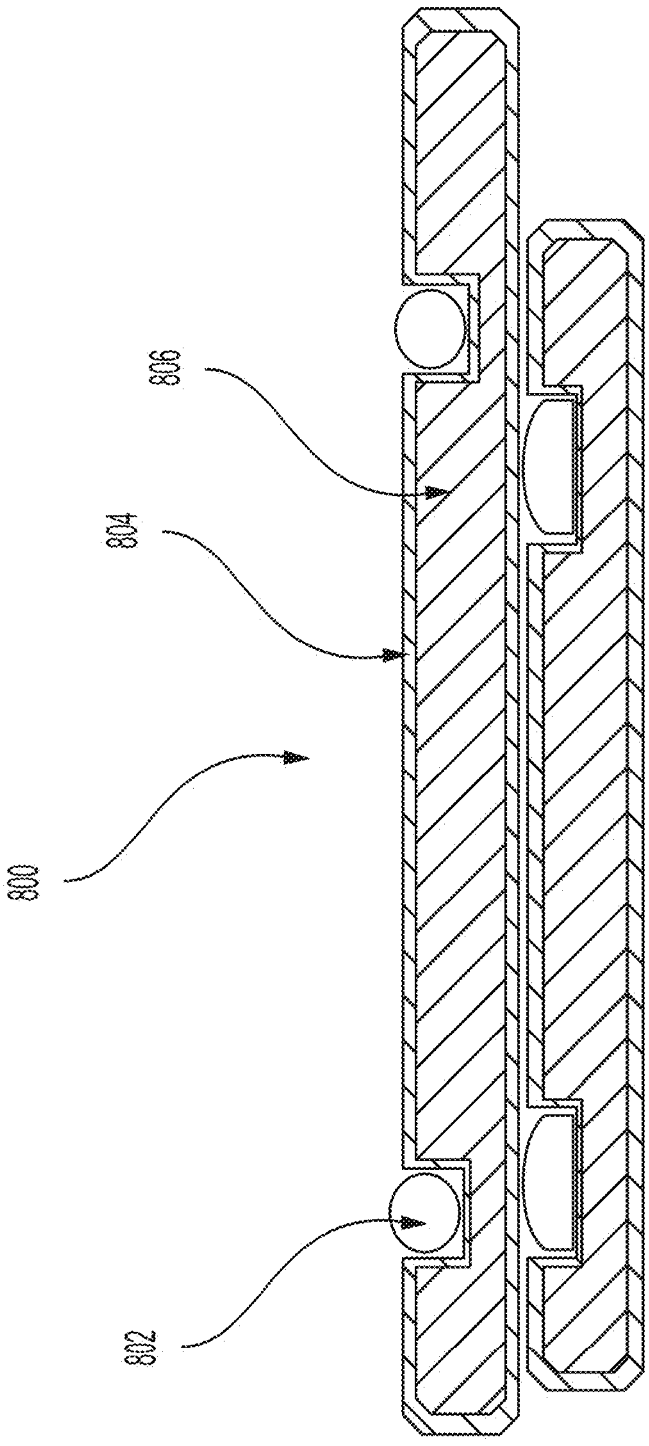
FIG. 8 is a cross-sectional diagram of a portion of a wet-mate connector assembly that includes a stiffening material within an insulating material according to one example of the present disclosure.

FIG. 8 is a cross-sectional diagram of a portion of a wet-mate connector assembly 800 that includes a stiffening material 806 within an insulating material 804 according to one example of the present disclosure. The stiffening material 806 can be an inner core embedded within an insulating material 804 of a male portion or a female portion of the wet-mate connector assembly 800. The stiffening material 806 may be a single component included within the insulating material 804, rather than multiple components as depicted in FIGS. 6-7. The stiffening material 806 may be partially or fully encapsulated by the insulating material 804. The insulating material 804 can be a ceramic, PEEK, or another material with insulating properties. The proportion of insulating material 804 to stiffening material 806 may affect the stiffness of the portion of the wet-mate connector assembly 800. For example, portions that include higher amounts of stiffening material 806 may be greater than portions that include lower amounts of stiffening material 806. The stiffening material 806 may be a steel material, a ceramic material, or another hard material. The stiffening material 806 may prevent portions of the wet-mate connector assembly 800 from deforming or deflecting by increasing a contact pressure of seals in a contact chamber of the wet-mate connector assembly 800. The increased contact pressure in the contact chamber may prevent fluids from entering the wet-mate connector assembly 800.

Figure 9:
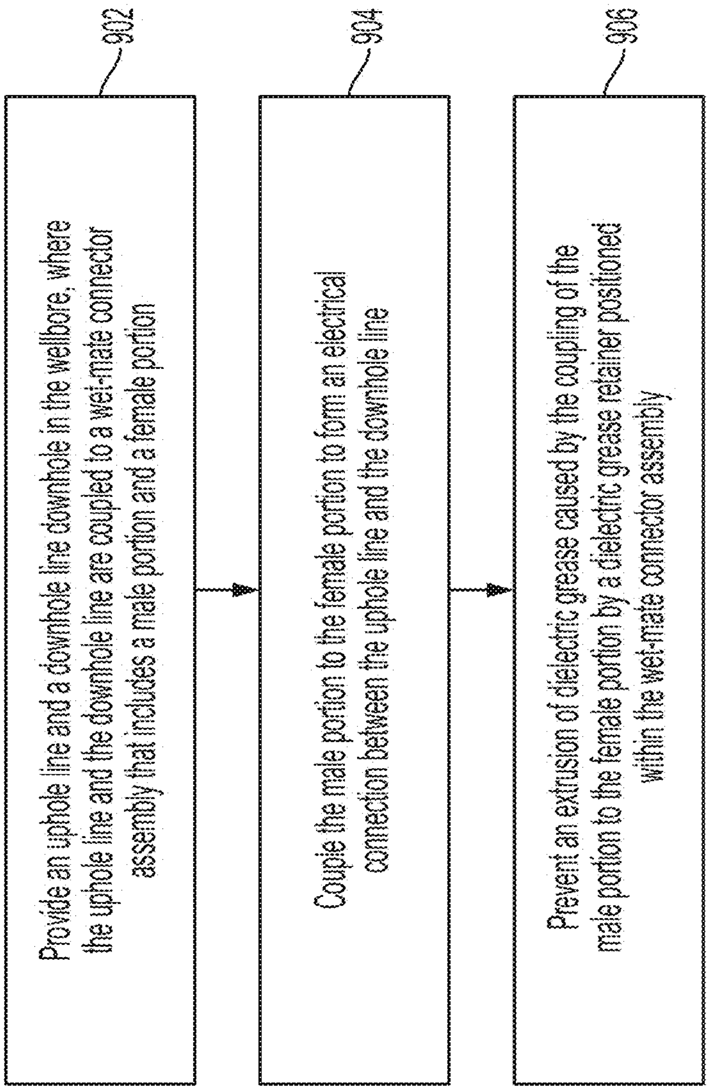
FIG. 9 is a flowchart of a method for deploying a wet-mate connector assembly with a dielectric grease retainer and a stiffening material downhole in a wellbore according to one example of the present disclosure.

FIG. 9 is a flowchart of a method for deploying a wet-mate connector assembly with a dielectric grease retainer and a stiffening material downhole in a wellbore according to one example of the present disclosure.

At block 902, an uphole line and a downhole line are provided downhole in a wellbore. The uphole line and the downhole line can be coupled to a wet-mate connector assembly. The wet-mate connector assembly can include a male portion and a female portion that include a stiffening material. In some examples, the male portion and the female portion may be an insulator band made of an insulating material, such as ceramic, PEEK, or another insulating material. The male portion and female portion may provide components of the wet-mate connector assembly with electrical resistance and insulation from drilling fluids or other fluids that may be present in the wellbore. The stiffening material may be made of a steel material, a ceramic material, or any other hard material. The stiffening material may prevent the wet-mate connector assembly from being deformed or deflected due to high temperatures and pressures downhole.

At block 904, the male portion and the female portion are coupled together to form an electrical connection between the uphole line and the downhole line. In some examples, the male portion and the female portion may include electrical contact rings, which may form the electrical connection when the male portion and the female portion are mechanically coupled together. The wet-mate connector assembly may include one or more seals that may prevent fluids from entering the wet-mate connector assembly. The fluid flow path may be a contact chamber that can encapsulate the electrical contact rings coupled to the male portion and the female portion.

At block 906, a dielectric grease retainer positioned within the wet-mate connector assembly prevents an extrusion of dielectric grease caused by the coupling of the male portion to the female portion. The dielectric grease may prevent exposed portions of the wet-mate connector assembly from experiencing corrosion or contact with fluids that may be present in the wellbore. An extrusion of the dielectric grease may allow fluids to pass into the contact chamber, reducing the insulation resistance of the electrical connection. In some examples, the dielectric grease retainer may be a cup seal, a ribbed seal, or a shallow ribbed molded seal. The dielectric grease retainer may be made of an elastic material with a high bulk modulus and a low shear modulus.

In some aspects, system, wet-mate connector assembly, and method for are provided for a wet-mate connector assembly with a dielectric grease retainer and a stiffening material for electric disconnect in a wellbore according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a wet-mate connector assembly positionable downhole in a wellbore, the wet-mate connector assembly comprising: a male portion; a female portion configurable to receive the male portion to form an electrical connection with the male portion; and a dielectric grease retainer positionable proximate the male portion and the female portion for retaining dielectric grease extruded from a contact chamber when the female portion receives the male portion, the contact chamber being defined by an outer diameter of the male portion and an inner diameter of the female portion, wherein the male portion and the female portion comprise a stiffening material and an insulating material.

Example 2 is the system of example(s) 1, wherein the dielectric grease retainer is a cup seal positionable to trap dielectric grease in the contact chamber extruded from the contact chamber within the cup seal.

Example 3 is the system of any of example(s) 1-2, wherein the dielectric grease retainer is a ribbed seal comprising a plurality of sealing segments positionable to trap dielectric grease extruded from the contact chamber between the plurality of sealing segments, wherein the ribbed seal is configurable to seal the contact chamber and insulate the electrical connection.

Example 4 is the system of any of example(s) 1-3, wherein the plurality of sealing segments on the ribbed seal are angular ridges.

Example 5 is the system of any of example(s) 1-4, wherein the stiffening material is positionable on at least one of an outer diameter of the insulating material or an inner diameter of the insulating material.

Example 6 is the system of any of example(s) 1-5, wherein the stiffening material is positionable within at least one of: (i) one or more grooves on an outer diameter of the insulating material or (ii) one or more grooves on an inner diameter of the insulating material.

Example 7 is the system of any of example(s) 1-6, wherein the stiffening material comprises an inner core, and wherein the insulating material comprises an outer layer positionable around the inner core.

Example 8 is the system of any of example(s) 1-7, wherein the insulating material comprises at least one of a ceramic material or a polyetheretherketone material, and wherein the stiffening material comprises steel.

Example 9 is a wet-mate connector assembly in a wellbore comprising: a male portion; a female portion configurable to receive the male portion to form an electrical connection with the male portion; and a dielectric grease retainer positionable proximate the male portion and the female portion for retaining dielectric grease extruded from a contact chamber when the female portion receives the male portion, the contact chamber being defined by an outer diameter of the male portion and an inner diameter of the female portion, wherein the male portion and the female portion comprise a stiffening material and an insulating material.

Example 10 is the wet-mate connector assembly of example(s) 9, wherein the dielectric grease retainer is a cup seal positionable to trap dielectric grease in the contact chamber by sealing off a fluid flow path connecting the contact chamber with the wellbore.

Example 11 is the wet-mate connector assembly of any of example(s) 9-10, wherein the dielectric grease retainer is a ribbed seal comprising a plurality of sealing segments positionable to trap dielectric grease extruded from the contact chamber between the plurality of sealing segments, wherein the ribbed seal is configurable to seal the contact chamber and insulate the electrical connection.

Example 12 is the wet-mate connector assembly of any of example(s) 9-11, wherein the stiffening material is positionable on at least one of an outer diameter of the insulating material or an inner diameter of the insulating material.

Example 13 is the wet-mate connector assembly of any of example(s) 9-12, wherein the stiffening material is positionable within at least one of: (i) one or more grooves on an outer diameter of the insulating material or (ii) one or more grooves on an inner diameter of the insulating material.

Example 14 is the wet-mate connector assembly of any of example(s) 9-13, wherein the stiffening material comprises an inner core, and wherein the insulating material comprises an outer layer positionable around the inner core.

Example 15 is a method comprising: providing an uphole line and a downhole line downhole in a wellbore, the uphole line and the downhole line being couplable to a wet-mate connector assembly, wherein the wet-mate connector assembly includes a male portion and a female portion, the male portion and the female portion comprising a stiffening material and an insulating material; coupling the male portion to the female portion to form an electrical connection between the uphole line and the downhole line; and preventing, by a dielectric grease retainer positionable within the wet-mate connector assembly, an extrusion of dielectric grease caused by the coupling of the male portion to the female portion.

Example 16 is the method of example(s) 15, wherein the dielectric grease retainer is a cup seal, and wherein preventing the extrusion of dielectric grease further comprises: trapping dielectric grease extruded from the coupling of the male portion and the female portion within the cup seal.

Example 17 is the method of any of example(s) 15-16, wherein the dielectric grease retainer is a ribbed seal that includes a plurality of sealing segments, and wherein preventing the extrusion of dielectric grease further comprises: trapping dielectric grease extruded during the coupling of the male portion and the female portion between the plurality of sealing segments; and sealing a contact chamber defined by an outer diameter of the male portion and an inner diameter of the female portion to insulate the electrical connection.

Example 18 is the method of any of example(s) 15-17, wherein the stiffening material is positioned on at least one of an outer diameter of the insulating material or an inner diameter of the insulating material.

Example 19 is the method of any of example(s) 15-18, wherein the stiffening material is positioned within at least one of: (i) one or more grooves on an outer diameter of the insulating material or (ii) one or more grooves on an inner diameter of the insulating material.

Example 20 is the method of any of example(s) 15-19, wherein the stiffening material includes an inner core, and wherein the insulating material includes an outer layer around the inner core.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

a wet-mate connector assembly positionable downhole in a wellbore, the wet-mate connector assembly comprising:

a male portion;

a female portion configurable to receive the male portion to form an electrical connection with the male portion; and a dielectric grease retainer positionable proximate the male portion and the female portion for retaining dielectric grease extruded from a contact chamber when the female portion receives the male portion, the contact chamber being defined by an outer diameter of the male portion and an inner diameter of the female portion, wherein the male portion and the female portion comprise a stiffening material and an insulating material.

2. The system of claim 1, wherein the dielectric grease retainer is a cup seal positionable to trap dielectric grease in the contact chamber extruded from the contact chamber within the cup seal.

3. The system of claim 1, wherein the dielectric grease retainer is a ribbed seal comprising a plurality of sealing segments positionable to trap dielectric grease extruded from the contact chamber between the plurality of sealing segments, wherein the ribbed seal is configurable to seal the contact chamber and insulate the electrical connection.

4. The system of claim 3, wherein the plurality of sealing segments on the ribbed seal are angular ridges.

5. The system of claim 1, wherein the stiffening material is positionable on at least one of an outer diameter of the insulating material or an inner diameter of the insulating material.

6. The system of claim 1, wherein the stiffening material is positionable within at least one of: (i) one or more grooves on an outer diameter of the insulating material or (ii) one or more grooves on an inner diameter of the insulating material.

7. The system of claim 1, wherein the stiffening material comprises an inner core, and wherein the insulating material comprises an outer layer positionable around the inner core.

8. The system of claim 1, wherein the insulating material comprises at least one of a ceramic material or a polyetheretherketone material, and wherein the stiffening material comprises steel.

9. A wet-mate connector assembly in a wellbore comprising:

a male portion;

a female portion configurable to receive the male portion to form an electrical connection with the male portion; and a dielectric grease retainer positionable proximate the male portion and the female portion for retaining dielectric grease extruded from a contact chamber when the female portion receives the male portion, the contact chamber being defined by an outer diameter of the male portion and an inner diameter of the female portion, wherein the male portion and the female portion comprise a stiffening material and an insulating material.

10. The wet-mate connector assembly of claim 9, wherein the dielectric grease retainer is a cup seal positionable to trap dielectric grease in the contact chamber by sealing off a fluid flow path connecting the contact chamber with the wellbore.

11. The wet-mate connector assembly of claim 9, wherein the dielectric grease retainer is a ribbed seal comprising a plurality of sealing segments positionable to trap dielectric grease extruded from the contact chamber between the plurality of sealing segments, wherein the ribbed seal is configurable to seal the contact chamber and insulate the electrical connection.

12. The wet-mate connector assembly of claim 9, wherein the stiffening material is positionable on at least one of an outer diameter of the insulating material or an inner diameter of the insulating material.

13. The wet-mate connector assembly of claim 9, wherein the stiffening material is positionable within at least one of: (i) one or more grooves on an outer diameter of the insulating material or (ii) one or more grooves on an inner diameter of the insulating material.

14. The wet-mate connector assembly of claim 9, wherein the stiffening material comprises an inner core, and wherein the insulating material comprises an outer layer positionable around the inner core.

15. A method comprising:

providing an uphole line and a downhole line downhole in a wellbore, the uphole line and the downhole line being couplable to a wet-mate connector assembly, wherein the wet-mate connector assembly includes a male portion and a female portion, the male portion and the female portion comprising a stiffening material and an insulating material;

coupling the male portion to the female portion to form an electrical connection between the uphole line and the downhole line; and preventing, by a dielectric grease retainer positionable within the wet-mate connector assembly, an extrusion of dielectric grease caused by the coupling of the male portion to the female portion.

16. The method of claim 15, wherein the dielectric grease retainer is a cup seal, and wherein preventing the extrusion of dielectric grease further comprises:

trapping dielectric grease extruded from the coupling of the male portion and the female portion within the cup seal.

17. The method of claim 15, wherein the dielectric grease retainer is a ribbed seal that includes a plurality of sealing segments, and wherein preventing the extrusion of dielectric grease further comprises:

trapping dielectric grease extruded during the coupling of the male portion and the female portion between the plurality of sealing segments; and sealing a contact chamber defined by an outer diameter of the male portion and an inner diameter of the female portion to insulate the electrical connection.

18. The method of claim 15, wherein the stiffening material is positioned on at least one of an outer diameter of the insulating material or an inner diameter of the insulating material.

19. The method of claim 15, wherein the stiffening material is positioned within at least one of: (i) one or more grooves on an outer diameter of the insulating material or (ii) one or more grooves on an inner diameter of the insulating material.

20. The method of claim 15, wherein the stiffening material includes an inner core, and wherein the insulating material includes an outer layer around the inner core.

* * * * *